Nov. 18, 1969 D. R. BESTER ET AL 3,479,461

DETACHABLE ELECTRICAL SWITCHING APPARATUS FOR MULTICHANNEL RADIO COMMUNICATION SYSTEMS

Filed Nov. 9, 1965 4 Sheets-Sheet 1

INVENTORS
DENNIS ROY BESTER
GEOFFREY PRATT
BY
Kurchen, Krichten & Ottinger
ATTORNEYS INVENTORS
Dennis Roy Bester
Geoffrey Pratt
BY
Kirschstein, Kirschstein & Ottinger
ATTORNEYS Nov. 18, 1969 D. R. BESTER ET AL 3,479,461

DETACHABLE ELECTRICAL SWITCHING APPARATUS FOR MULTICHANNEL RADIO COMMUNICATION SYSTEMS

Filed Nov. 9, 1965 4 Sheets-Sheet 3

INVENTORS
DENNIS ROY BESTER
GEOFFREY PRATT
BY
Kirschstein, Kirschstein & Ottinger
ATTORNEYS INVENTORS
DENNIS ROY BESTER
GEOFFREY PRATT
BY
[signature]
ATTORNEYS 3,479,461

DETACHABLE ELECTRICAL SWITCHING APPARATUS FOR MULTICHANNEL RADIO COMMUNICATION SYSTEMS

Dennis R. Bester, Coventry, and Geoffrey Pratt, Bulkington, near Nuneaton, England, assignors to The General Electric Company Limited, London, England, a British company Filed Nov. 9, 1965, Ser. No. 506,981
Claims priority, application Great Britain, Nov. 13, 1964, 46,317/64
Int. Cl. H04j 1/02, 3/02
U.S. Cl. 179—15 1 Claim

ABSTRACT OF THE DISCLOSURE

Switching apparatus for a radio communication system having a plurality of transmitters and receivers linking two stations, and one or more standby transmitters and receivers to which traffic can be diverted by way of the transmitter or receiver. The switching apparatus comprises a respective switching network for each channel that is to be connected to a standby transmitter or receiver, each network comprising a T network of diodes with biasing means to control the impedance presented by the diodes. One diode from each network is located in a central unit to which the standby apparatus is connected while the remaining two diodes and the other components of each network are housed in a separate respective unit that is physically and electrically detachably connected to the first unit by means of coaxial plugs and sockets.

This invention relates to electrical switching apparatus.

In particular, the invention relates to electrical switching apparatus for selectively connecting any one of a plurality of first two-conductor signal paths to a further two-conductor signal path.

In a known form of multichannel radio communication systems in which the channels are arranged in groups each of which is associated with a different radio carrier frequency, and hence with a different transmitted frequency band, the message signals associated with any one group of channels are first modulated onto respective sub-carrier signals whose frequencies are equally spaced over a given band of frequencies. The modulated sub-carrier signals of the group are then added together and are modulated onto an intermediate frequency carrier. The resulting signal, which is referred to herein as an intermediate-frequency or I.F. signal, is then modulated onto the carrier signal associated with that group of channels and the modulated carrier signal is transmitted.

In order to maintain communication in the event of a breakdown of one or other of the carrier signal transmitter units, it is common practice to provide at least one standby transmitter unit, with its associated R.F. frequency changer, to which the intermediate-frequency signal may be switched from the faulty transmitter unit. This provision of a standby unit requires that the intermediate frequency signal paths associated one with each of the groups of channels must be capable of being connected, by way of respective switch networks, to the input circuit of the standby unit.

At the receiving station of such a system the use of the standby frequency band to carry the signals associated with any one of the groups of channels requires that, at the receiving station, the intermediate frequency paths associated one with each of the groups of channels must be capable of being connected, by way of respective switch networks, to receive intermediate frequency signals from the standby receiver.

According to the present invention in electrical switching apparatus for selectively connecting any one of a plurality of first two-conductor signal paths to a further two-conductor signal path by way of a plurality of switch networks which are associated one with each of said first two-conductor paths, each switch network comprising a T network having a rectifier element in each of the three arms thereof, and means to apply a bias potential to the junction of said arms, the rectifier elements being so poled that with one value of bias potential the rectifier elements in the series arms of the network are forward biased and the rectifier element in the shunt arm is reverse biased so that said network provides a low impedance path between the respective first two-conductor path and said further two-conductor path, while with a different value of bias potential all three rectifier elements are biased the other way to that just stated so that the network provides a high impedance between the respective first two-conductor path and said further two-conductor path, the apparatus is constructed such that those of said series arm rectifier elements in said networks that are nearer the further two-conductor path and the common connections to said further two-conductor path are located in one unit, while the remaining elements of each switch network are located in a separate unit which is individual to that network and which is detachably connected to said one unit.

Electrical switching apparatus for selectively connecting any one of a plurality of two-conductor paths to a further two-conductor path, the apparatus being in accordance with the present invention, will now be described by way of example with reference to the accompanying drawings of which:

Figure 1:
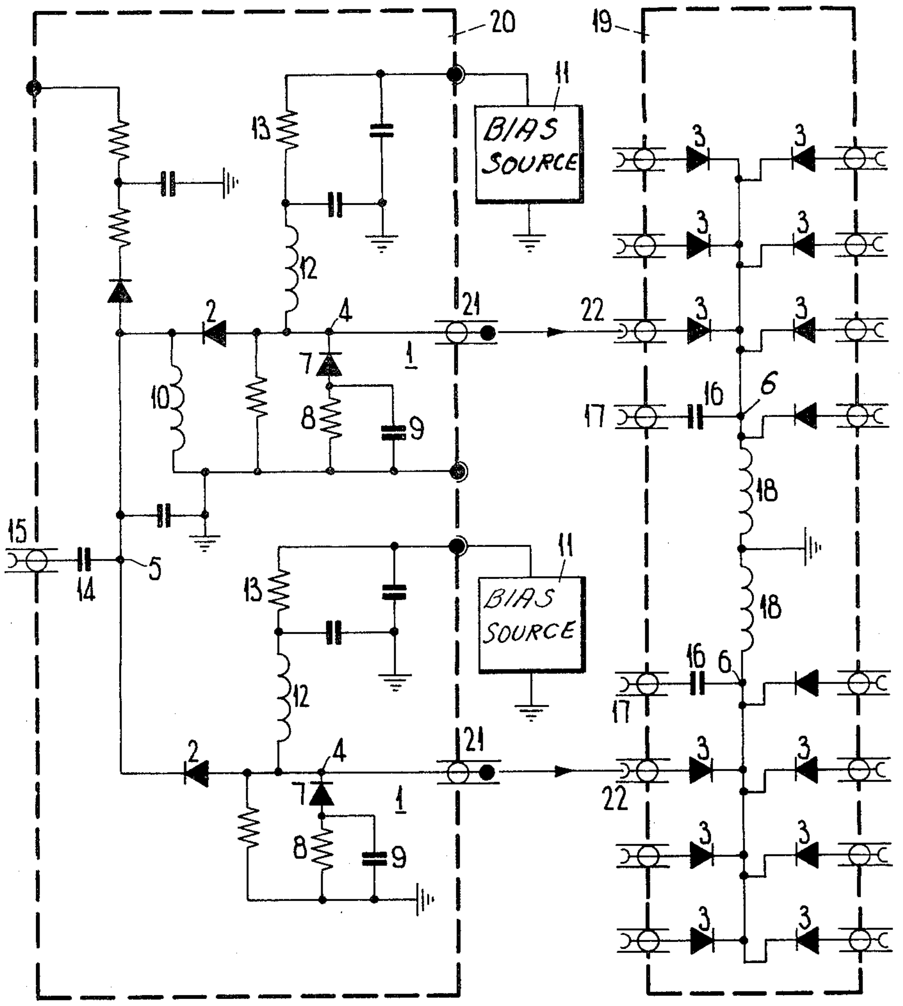
FIGURE 1 shows a part of the apparatus diagrammatically.

Referring to FIGURE 1 the apparatus comprises six identical pairs of switch networks 1, of which only one pair is shown in FIGURE 1. Each switch network of a pair comprises rectifier elements 2 and 3 having their anodes connected to a common point 4 and their cathodes connected respectively to an input point 5 which is common to the pair of networks and to one of a pair of output points 6, each output point 6 being common to one network 1 of each of the six pairs of networks. A rectifier element 7 in each network 1 has its cathode connected to the common point 4 and its anode connected to earth by way of a resistor 8 and a capacitor 9 connected in parallel. The input point 5 is connected to earth by way of an inductor 10, and the common point 4 of each network 1 is connected to a source of biasing potential 11 by way of an inductor 12 and a resistor 13 in series.

The input point 5 of each pair of networks 1 is connected by way of a capacitor 14 to the inner terminal of a respective coaxial input socket 15 the outer terminal of which is connected to earth. The output points 6 are connected by way of respective capacitors 16 to the inner terminals of respective coaxial output sockets 17. The outer terminals of the two output sockets 17 being connected to earth. The output points 6 are also connected to earth by way of respective inductors 18.

Figure 2:
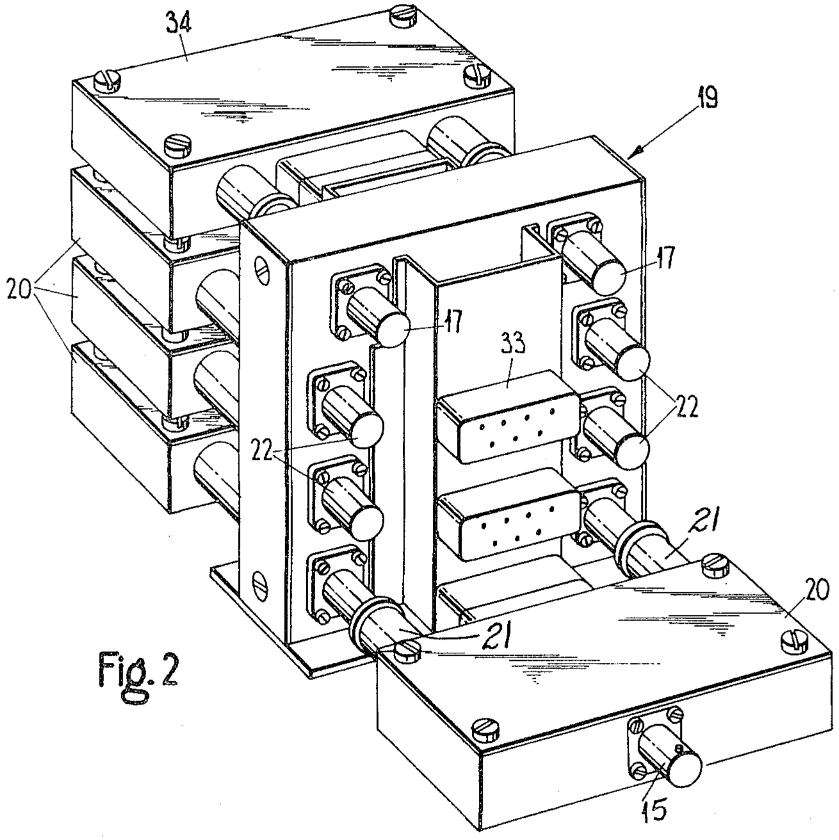
FIGURE 2 shows a perspective view of a part of the apparatus.

Referring also to FIGURE 2, in order to facilitate servicing of the switch networks 1 the apparatus is constructed as a number of separate units. The rectifier elements 3 of all twelve of the networks 1 are housed in a unit 19, together with the capacitors 16 and the inductors 18. The remaining elements of each of the six pairs of networks 1 are housed in six further units 20 respectively, each of the further units 20 having mounted thereon a pair of coaxial plugs 21 which co-operate with a respective pair of coaxial sockets 22 mounted on the unit 19 to provide, in respect of each network 1 in the further unit 20, the required electrical connection between, on the one hand, the point 4 and, on the other hand, the anode of the rectifier element 3. The outer terminals of the coaxial plugs 21 and sockets 22 provide continuous earth connections.

The unit 19 is in the form of a shallow rectangular box having three pairs of the coaxial sockets 22 mounted on each of its two major faces, and the pair of coaxial sockets 17 mounted on one of said major faces. The units 20, which are also in the form of shallow rectangular boxes, each have their pair of coaxial plugs 21 mounted along one minor face or side. When the apparatus is assembled, therefore, the units 20 are arranged three on each side of the unit 19, and each unit 20 has its major faces parallel to the major faces of the adjacent units 20 and perpendicular to the major faces of the unit 19. The coaxial input socket 15 of each of the units 20 is mounted on the minor face opposite that on which are mounted the pair of coaxial plugs 21.

Figure 3:
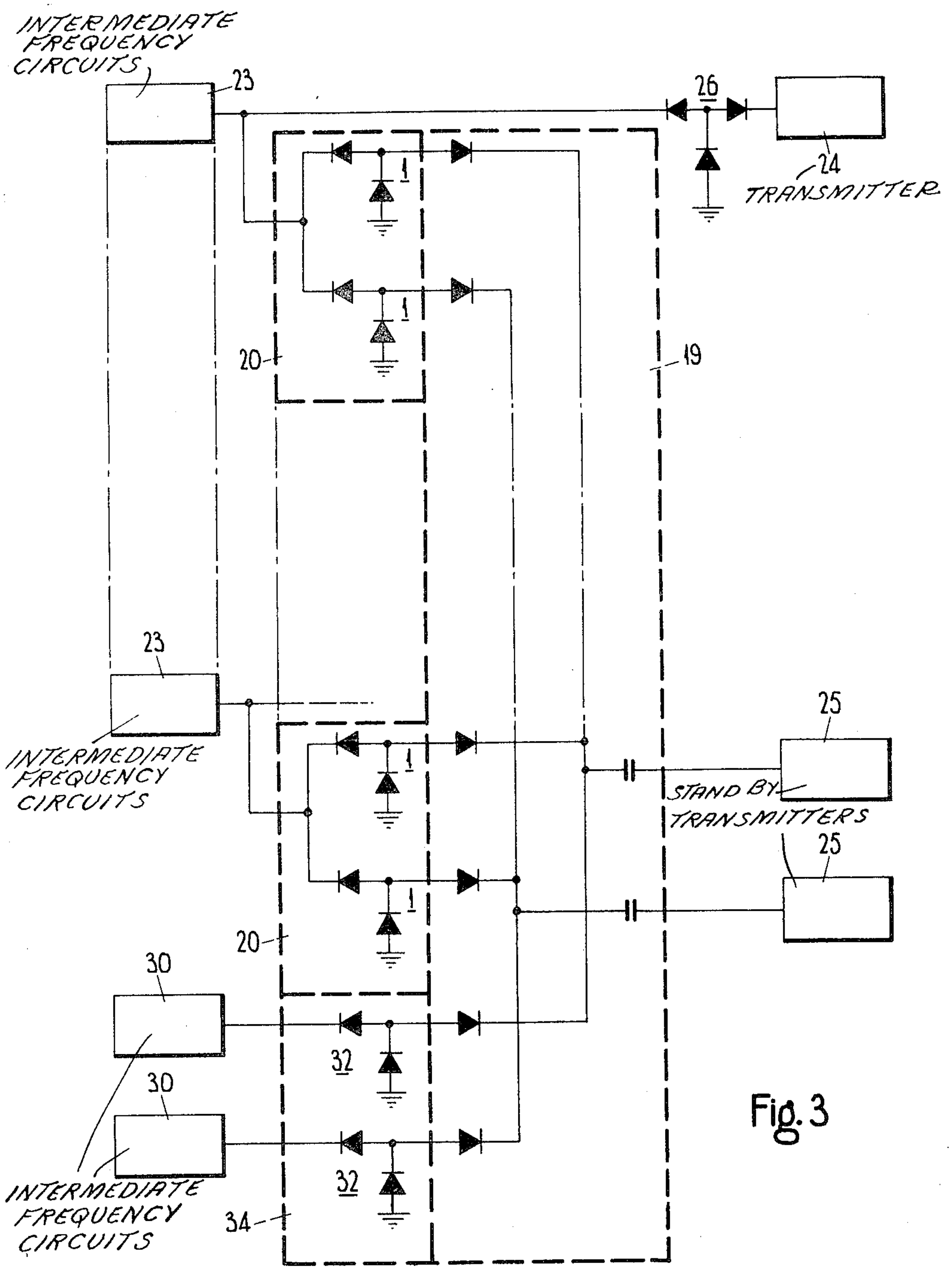
FIGURE 3 shows schematically one application of the apparatus.

Referring to FIGURE 3, the apparatus described above in detail in relation to FIGURE 1 may be used at the transmitting station of a multi-channel communication system in which the channels are arranged in six groups associated respectively with six intermediate frequency signal circuits 23 which are normally connected respectively to six radio frequency transmitters 24 each operating within a different frequency band. Two further transmitters 25 act as standby transmitters, and each is capable of carrying the intelligence carried by any one of the first six transmitters 24. The signals in any one of the six groups of channels are modulated onto respective sub-carriers whose frequencies are equally spaced over a given band of frequencies, and the resulting modulated sub-carriers are then added together and are frequency modulated onto an intermediate-frequency carrier signal. The routing of the signals in any one group of channels either to the respective one of the six transmitters 24 or to one of the two standby transmitters 25 is carried out at the intermediate frequency.

In operation the coaxial input sockets 15 of the six units 20 are connected respectively to paths carrying the intermediate frequency signals to the six transmitters 24, while the two output sockets 17 are connected respectively to the two standby transmitters 25. When the six transmitters 24 are all working normally, so that a connection to a standby transmitter 25 is not required, a negative bias potential is applied to the points 4 in all the networks 1, so that the rectifier elements 2 and 3 are reverse biased, and the rectifier elements 7 in all the networks 1 are forward biased. In this way all of the switch networks 1 offer a high impedance to the flow of signal current between their input and output terminals.

If, however, one of the six transmitters 24 breaks down, or if one of the corresponding receivers at the receiving station breaks down, a positive bias potential is applied to the point 4 in a selected one of the pair of switch networks 1 associated with the particular transmitter 24 (or receiver), so that the rectifier elements 2 and 3 in that one switch network 1 are forward biased while the rectifier element 7 in that network 1 is reverse biased. In this way the selected network 1 is made to present a low impedance to the passage of signal currents between its input and output terminals, so that the intermediate frequency signal passing to the transmitter 24 which has broken down, or to the transmitter 24 associated with a receiver which has broken down, is applied by way of the selected network 1 to the respective standby transmitter 25. At the same time a switch network 26 may be operated to disconnect the unused transmitter 24.

Figure 4:
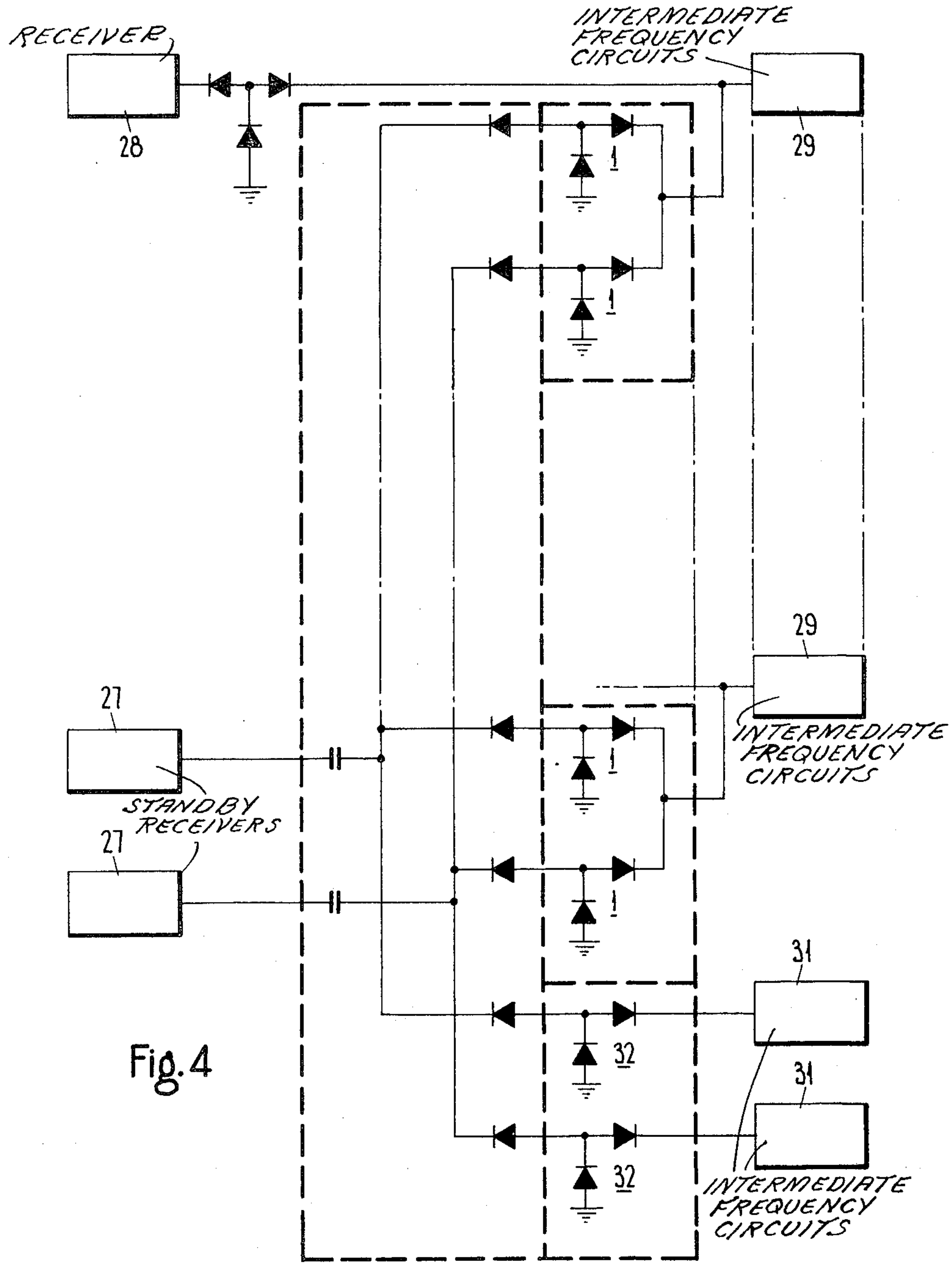
FIGURE 4 shows schematically another application of the apparatus.

The reverse arrangement of switch networks 1 to that described above may be used at a receiving station, as shown in FIGURE 4 to effect the interconnections required when a standby receiver 27 is in use.

The six receivers 28 are normally connected to six intermediate frequency circuits 29 respectively, but either of two standby receivers 27 may be connected to any one of the six circuits 29 as required by way of the respective networks 1.

If the standby transmitters 25 and receivers 27 are required to carry occasional message signals other than those associated with the six groups of channels the intermediate frequency signal circuits 30 and 31 provided for these occasional message signals may be connected to the inputs of the standby transmitters 25 and the outputs of the standby receivers 27 respectively by way of further switch networks 32 similar to the networks 1 described above.

Referring again to FIGURE 2 the bias voltages required to operate the switch networks 1 are applied to the respective units 20 from the sources 11 by way of sockets 33 mounted on the unit 19 and cooperating plungs (not shown) mounted between the coaxial plugs 21 on the units 20. The switch networks 32 are housed in a unit 34 similar to the units 20.

It will be appreciated that in the apparatus described above the removal of one of the units 20 for servicing or replacement will leave in place the rectifier elements 3 of the networks 1 in that unit 20, and since there will be effectively zero bias across this diode 3 it will present a fairly high impedance between the respective point 6 and the coaxial socket 22 so that the operation of the remaining switch networks 1 is not interrupted.

We claim:

1. Electrical switching apparatus for selectively connecting any one of a plurality of first two-conductor signal paths by way of respective switching networks to a further two conductor signal path, comprising a first structural unit including at least one diode and a respective connector in respect of each of said plurality of first paths and circuit means connecting each diode between the respective connector and a common point, a plurality of second structural units, one in respect of each of said plurality of first paths, each said second structural unit including at least two diodes, an input and an output connector and circuit means connecting said two diodes in circuit between said input and output connectors, one of the connectors of each second unit detachably cooperating with a respective connector on said first unit electrically to connect the two diodes of said second unit and the respective diode of said first unit to form a T switching network of diodes and mechanically to couple said first and second units, and bias circuit means to apply biasing potentials to said T networks of diodes selectively to establish conducting or blocking conditions for said networks.

References Cited

UNITED STATES PATENTS

| | | | |
|---|---|---|---|
| 2,958,857 | 11/1960 | Johnson et al. | 340—176 |
| 2,657,318 | 10/1953 | Rack | 307—88.5 |
| 3,126,488 | 3/1964 | Johnson | 307—88.5 |
| 3,141,098 | 7/1964 | Ravenhill et al. | 307—88.5 |

FOREIGN PATENTS 651,369 10/1962 Canada.

OTHER REFERENCES

The Radio Amateur's Handbook, 42nd edition, 1965, p. 354.

RICHARD MURRAY, Primary Examiner

C. R. VON HELLENS, Assistant Examiner

U.S. Cl. X.R.

307—259; 325—15, 158, 302